(12) United States Patent
Takeshima et al.

(10) Patent No.: US 6,462,933 B2
(45) Date of Patent: Oct. 8, 2002

(54) THIN FILM MULTILAYER CAPACITOR AND MOUNTING METHOD THEREFOR

(76) Inventors: Yutaka Takeshima, c/o (A170) Intellectual Property Department, Murata Manufacturing Co., Ltd., 26-10, Tenjin 2-chrome, Nagaokakyo-shi, Kyoto-fu 617-8555 (JP); Yukio Sakabe, c/o (A170) Intellectual Property Department, Murata Manufacturing Co., Ltd., 26-10, Tenjin 2-chrome, Nagaokakyo-shi, Kyoto-fu 617-8555 (JP)

( * ) Notice: Subject to any disclaimer, the term of this patent is extended or adjusted under 35 U.S.C. 154(b) by 0 days.

(21) Appl. No.: 09/773,642

(22) Filed: Jan. 31, 2001

(65) Prior Publication Data

US 2001/0015884 A1 Aug. 23, 2001

(30) Foreign Application Priority Data

Feb. 3, 2000 (JP) .......................................... 2000-026527

(51) Int. Cl.[7] .............................................. H01G 4/228
(52) U.S. Cl. .................. 361/306.3; 361/303; 361/306.1
(58) Field of Search .............................. 361/301.1, 303, 361/306.1, 306.3, 309, 311–312, 321.2, 328–329

(56) References Cited

U.S. PATENT DOCUMENTS 3,710,211 A * 1/1973 Behn et al. ............... 361/306.3
6,034,864 A * 3/2000 Naito et al. ............... 361/306.1

* cited by examiner

Primary Examiner—Anthony Dinkins

(57) ABSTRACT

A thin film multilayer capacitor and a method for mounting it are provide wherein the capacitor is small and thin, can furnish a large capacitance, and is hard to be damaged at the time of mounting on a wiring substrate. The thin film multilayer capacitor 10 comprises a substrate 12 and a laminated body 14 formed thereon. The laminated body 14 is formed by laminating electrode layers 16 and dielectric layers 18. The electrode layers 16 are divided into a first group of electrode layers 16a and a second group of electrode layers 16b by the dielectric layers 18. The electrode layers 16a of the first group and the electrode layers 16b of the second group are laminated in an alternate manner with the dielectric layers 18 intervening therebetween, the plurality of electrode layers 16a of the first group are connected with each other, and the plurality of electrode layers 16b of the second group are also connected with each other. A protective film 20 is formed on the surrounding surfaces of the laminated body 14, and solder bumps 24 are formed at the openings 22.

19 Claims, 6 Drawing Sheets

THIN FILM MULTILAYER CAPACITOR AND MOUNTING METHOD THEREFOR

BACKGROUND OF THE INVENTION

1. Field of the Invention

The present invention relates to a thin film multilayer capacitor and a mounting method therefor. More particularly, the present invention relates to a thin film multilayer capacitor which is small and has a relatively large capacitance, and a mounting method therefor.

2. Description of the Related Art

In recent years, in connection with the movement toward a circuit having a higher density in the field of electronic parts, demand for further miniaturization and higher performance of a capacitor or the like has been increased. As a small capacitor, a multilayer ceramic capacitor or the like is known. A dielectric ceramic green sheet cut to a specified size is prepared for fabricating such a multilayer ceramic capacitor. This ceramic green sheet is subjected to printing with an electrode paste, is dried, is laminated, is compression-bonded and then is cut into a specified size followed by baking in order to form a chip. The chip is coated with an external electrode paste and then baked to produce a multilayer ceramic capacitor.

However, if a multilayer ceramic capacitor is fabricated in such a method, it is impossible to make dielectric layers thinner than the particle size of a raw ceramic material powder. Besides, owing to the problems of short circuits and disconnection at electrodes caused by the defects of the dielectric layers, it is difficult, at the present level of technology, to produce a capacitor that has dielectric layers with a thickness of 3 μm or less. Thus, there has been a limit in realizing a multilayer ceramic capacitor having a smaller size and a larger capacitance.

In order to solve such problems, a multilayer ceramic capacitor is proposed in Japanese Unexamined Patent Application Publication 56-144523, for example, in which a dielectric body portion is produced on a substrate by a sputtering method. A method for producing a thin film and electrode of $Al_2O_3$, $SiO_2$, $TiO_2$ or $BaTiO_3$ with a sputtering method is disclosed.

However, since materials such as $Al_2O_3$, $SiO_2$ and $TiO_2$ have small dielectric constants, it is necessary to make the film thickness very small if the capacitance of a capacitor is to be increased, entailing problems related to the reliability of electronic devices such as leak current and dielectric breakdown voltage. Accordingly, use of a material with a high dielectric constant such as $SrTiO_3(Ba,Sr)TiO_3$, $PbTiO_3$, $Pb(Zr,Ti)O_3$ and $Pb(Mg,Nb)O_3$ as well as $BaTiO_3$ can be considered. However, when such a material with a high dielectric constant is used in order to obtain a high dielectric constant in the state of a thin film, it is necessary to employ a deposition method such as a MOCVD method or the like for improving the crystallinity of the thin film when depositing the film at a high temperature, and since most of these materials having high dielectric constants are obtained by utilizing a solid sublimation technology, it is difficult to obtain a material having a high dielectric constant with good reproducibility at the time of lamination.

Furthermore, these thin films have a low mechanical strength. Thus, when a thin film multilayer capacitor that is a conventional multilayer ceramic capacitor, in which ceramic green sheets are laminated, is used as a chip part, there is a problem that it tends to be damaged. This is because it is necessary to move the capacitor while holding it by its thin film side when the capacitor is to be bonded to a wiring substrate at the substrate side. To solve such a problem, it is conceivable to form solder bumps on the surface side of a thin film which is opposite to the substrate side, and to move the thin film multilayer capacitor over to a wiring substrate while holding it by the substrate side, so as to mount it on the wiring substrate with the solder bumps.

However, in order to make progress in the movement toward miniaturization and height reduction of a thin film multilayer capacitor, it is necessary to make the substrate and the solder bumps as thin as possible, and in accordance with this, there is a possibility of damaging the substrate itself as a result of an external stress when the thin film multilayer capacitor contacts the wiring substrate in the course of the mounting. Furthermore, from the viewpoint of height reduction, it is desirable to hold the thin film multilayer capacitor which is supported by solder bumps in a configuration approximately parallel with the wiring substrate.

SUMMARY OF THE INVENTION

Accordingly, it is one of the primary objects of the present invention to provide a thin film multilayer capacitor that is small and thin, can provide a large capacitance, and is hard to damage in the course of mounting it on a wiring substrate.

Also, it is another object of the present invention to provide a thin film multilayer capacitor mounting method for mounting such a thin film multilayer capacitor on a wiring substrate.

The present invention is a thin film multilayer capacitor comprising a substrate and a laminated body made of a plurality of dielectric layers and electrode layers formed on the substrate, wherein at least three solder bumps for external connection are formed on the surface of the laminated body which is opposite to the substrate side.

In such a thin film multilayer capacitor, the electrode layers comprise a first group of electrode layers and a second group of electrode layers which are electrically divided by the dielectric layers, wherein the electrode layers of the first group are laminated with the electrode layers of the second group in an alternate manner, having the dielectric layers intervening therebetween, the dielectric layers being formed partially over the electrode layers, so that a structure can be realized in which the plurality of electrode layers of the first group are electrically connected with each other at portions where the dielectric layers are not formed, and the plurality of electrode layers of the second group are electrically connected with each other at the other portions where the electrode layers are not formed.

Furthermore, a protective film having openings is formed on the surface of the laminated body so that solder bumps can be formed with solder applied to connect to the electrode layers at the openings.

Furthermore, the dielectric layers are made of an oxide thin film comprising at least Ba or Sr which is preferably deposited by an MOCVD method using a dipivaloylmethanate complex adduct with triethylenetetramine or tetraethylenepentamine as a raw material.

The present invention also includes a thin film multilayer capacitor mounting method for mounting any of the thin film multilayer capacitors described above on a wiring substrate, wherein solder bumps are connected to the wirings on the wiring substrate.

By forming at least three solder bumps on a laminated body made of dielectric layers and electrode layers formed on a substrate, the surface of the laminated body which is opposite to the substrate side can be attached onto a wiring substrate. Accordingly, a thin film multilayer capacitor can be moved to the wiring substrate while holding it by the substrate side. Furthermore, by connecting at least three solder bumps to wirings on the wiring substrate, it is possible to mount a thin film multilayer capacitor on the wiring substrate in a state parallel with it, by which height reduction can be realized in the mounting. Furthermore, since solder bumps make it possible to mount a thin film multilayer capacitor on a wiring substrate in a state parallel with it, the thin film multilayer capacitor can be prevented from contacting the wiring substrate, and, therefore, damage on the thin film multilayer capacitor by an external stress can be prevented.

Furthermore, the area in which the electrode layers of the first group and the electrode layers of the second group face each other, is made larger by laminating the electrode layers of the first group and the electrode layers of the second group with dielectric layers intervening therebetween, resulting in a capacitor with a large capacitance.

Furthermore, the laminated body can be protected by forming a protective film, and by forming openings on the protective film, solder can be applied onto the laminated body to form solder bumps. Hereupon, it is preferable to form the openings and the solder bumps in a circular form, and it is desirable to strictly control the amount of solder for use in the solder bumps.

Furthermore, the dielectric layers are made of a member comprising at least Ba or Sr, and when deposition of the member is performed by a MOCVD method, using, as a raw material, a dipivaloylmethanate (DPM) complex adduct with triethylenetetramine or tetraethylenepentamine, $M(DPM)_2(tetraene)_2$ or $M(DPM)_2(triene)_2$; M=Ba, Sr, it can be used at a temperature not less than the melting temperature of the member, thus making it possible to vaporize it for conveyance, using a conventional bubbling method. Accordingly, the reproducibility at the time of deposition of the dielectric body is improved, and lamination of thin films with a high dielectric constant is made possible.

Furthermore, by using solder bumps to mount such a thin film multilayer capacitor on a wiring substrate, it is possible to move the thin film multilayer capacitor while holding it by the substrate side. Therefore, damage to the thin film multilayer capacitor can be prevented.

DESCRIPTION OF THE PREFERRED EMBODIMENTS

The above-described purposes, other purposes, features and advantages of the present invention will be made clearer by the following detailed description of the embodiments of the present invention with reference to the drawings.

Figure 1:
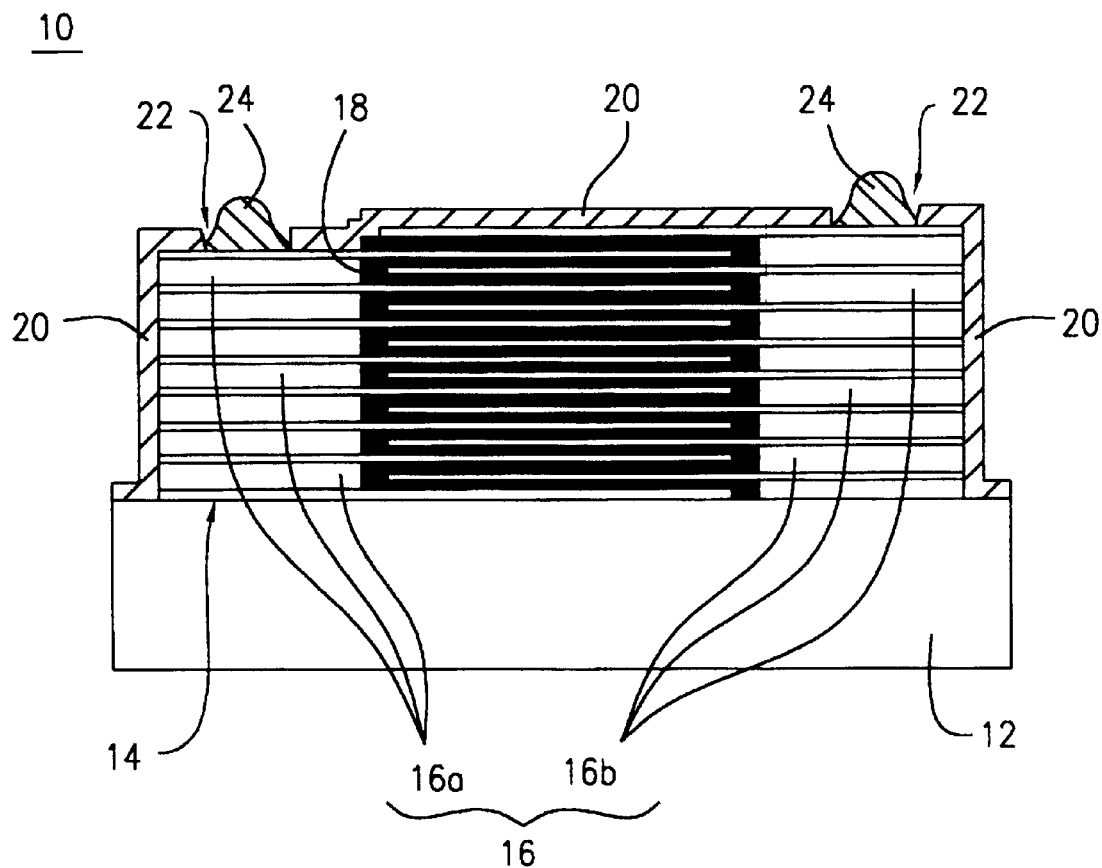
FIG. 1 is an illustrative cross-sectional view showing an example of the thin film multilayer capacitor according to the present invention.

FIG. 1 is an illustrative cross-sectional view showing an example of the thin film multilayer capacitor according to the present invention. A thin film multilayer capacitor 10 comprises a substrate 12. An R-plane sapphire substrate or the like is used for the substrate 12, for example. A laminated body 14 is formed on the substrate 12. The laminated body 14 is formed by laminating electrode layers 16 and dielectric layers 18. Pt or the like is used for the electrode layers 16, for example. The layers are formed by a sputtering method or the like. Furthermore, as the dielectric layers 18, an oxide thin film comprising at least Ba or Sr is used. For example, $(Ba,Sr)TiO_3$ or the like is used. These dielectric layers 18 are formed by an MOCVD method or the like. The electrode layers 16 are formed with a first group of a plurality of electrode layers 16a and a second group of a plurality of electrode layers 16b divided by the dielectric layers 18.

The electrode layers 16a of the first group are formed on one side in the lengthwise direction of the substrate 12, and the electrode layers 16b of the second group are formed on the other side in the lengthwise direction of the substrate 12. The electrode layers 16a of the first group and the electrode layers 16b of the second group are laminated in an alternate manner with the dielectric layers 18 intervening therebetween at the center of the substrate 12. These electrode layers 16a of the first group and the electrode layers 16b of the second group are in a form of a plurality of layers by a sputtering method or the like. Therefore, at the portions where the dielectric layers 18 are not formed, the plurality of electrode layers 16a of the first group are electrically connected with each other, and the plurality of electrode layers 16b of the second group are electrically connected with each other.

A protective film 20 is formed on the surrounding surfaces of the laminated body 14. As the protective film 20, a silicon oxide film or the like is used, for example. Such a film is formed by a plasma CVD method or the like. For example, four circular openings 22 are formed in the protective film 20 on a surface side of the laminated body 14, the surface side being opposite to the side of the substrate 12.

The first group of electrode layers 16a and the second group of electrode layers 16b are exposed by these openings 22, and solder bumps 24 are formed by placing solder on these portions. It is preferable to strictly control the amount of solder to be placed on the openings 22 of the protective film 20.

With this type of thin film multilayer capacitor 10, a very thin laminated body 14 can be obtained by forming the electrode layers 16 and the dielectric layers 18 by an MOCVD method, a sputtering method, or the like. When a thin laminated body 14 such as this is formed, the substrate 12 can be made thinner, making it possible to fabricate a thin film multilayer capacitor 10 which is smaller and thinner as a whole. Even with such a thin film multilayer capacitor which is small and thin as this, by laminating the electrode layers 16a of the first group and the electrode layers 16b of the second group in an alternate manner with the dielectric layers 18 intervening therebetween, the area in which these electrode layers face each other, is made larger, resulting in a capacitor with a larger capacitance.

Furthermore, a member comprising at least Ba or Sr is used in fabricating dielectric layers 18. When a dipivaloylmethanate complex adduct with triethylenetetramine or tetraethylenepentamine is used as a raw material, it can be used at a temperature not less than the melting point of the member, thus making it possible to vaporize it for conveyance, using a conventional bubbling method. Accordingly, the reproducibility at the time of deposition of the dielectric body is improved, and lamination of thin films with a high dielectric constant can be made possible.

Furthermore, since solder bumps 24 are formed on the laminated body 14, it is possible to mount the thin film multilayer capacitor 10 on a wiring substrate by connecting the solder bumps 24 to the wirings formed on the wiring substrate. Thus, it is possible to move the thin film multilayer capacitor 10 while holding it by the side of substrate 12 at the time of mounting, preventing damage on the laminated body 14 during the movement. Since this way of movement while holding it by the side of substrate 12 is made possible, automatic mounting is easily realized.

Furthermore, since four solder bumps 24 are formed, it is possible to mount the thin film multilayer capacitor 10 in a way that the thin film multilayer capacitor 10 is placed in a configuration parallel with the wiring substrate. Accordingly, height reduction can be realized when the thin film multilayer capacitor 10 is mounted. Furthermore, since it is possible to place the thin film multilayer capacitor 10 in parallel with the wiring substrate, it is possible to prevent the thin film multilayer capacitor 10 from contacting the wiring substrate, thus preventing damage on the thin film multilayer capacitor 10 by an external stress.

EXAMPLES

Figure 2:
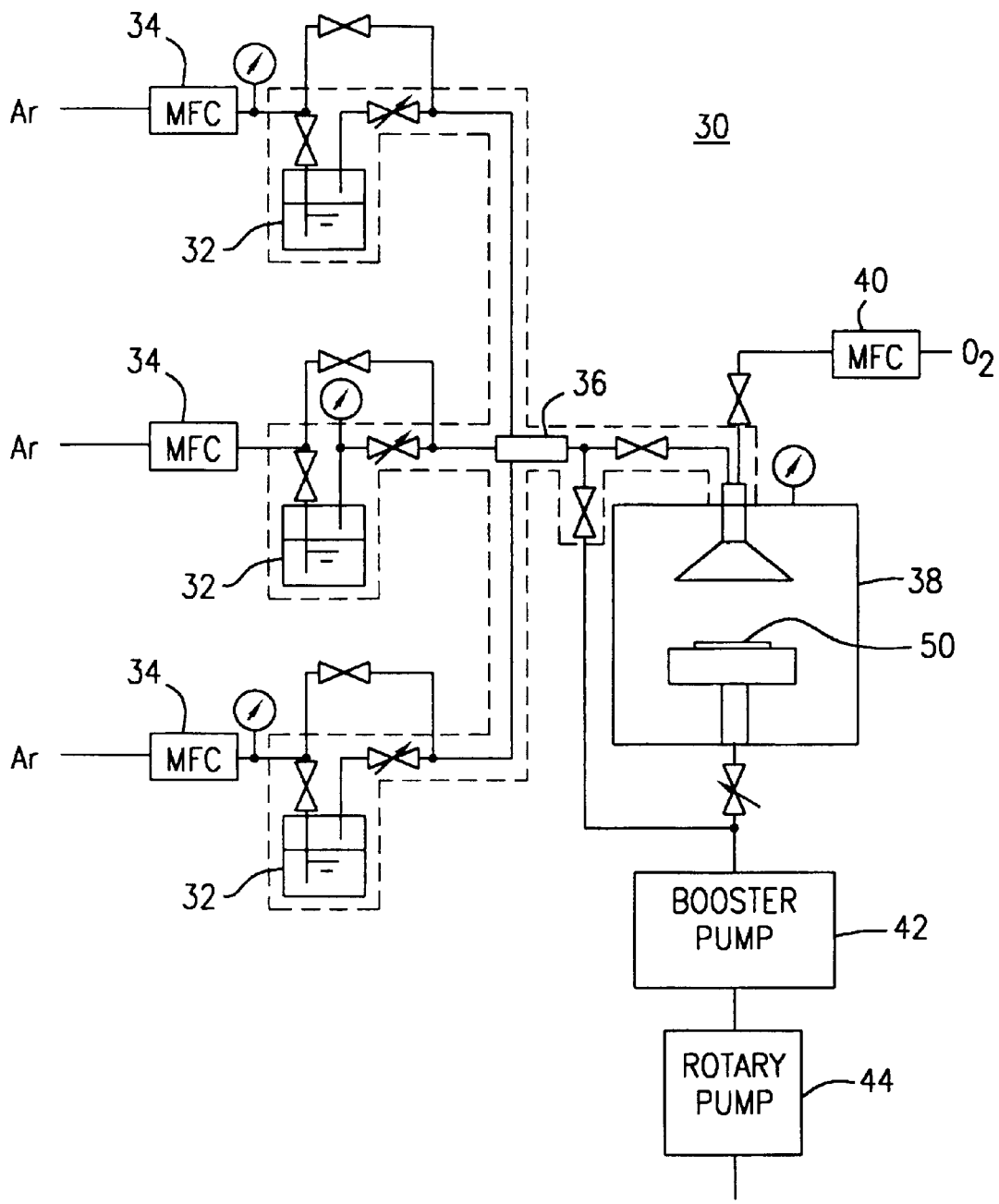
FIG. 2 is an illustrative view showing an MOCVD apparatus for fabricating the thin film multilayer capacitor according to the present invention.

An MOCVD apparatus 30 was prepared as shown in FIG. 2 for fabricating a $(Ba,Sr)TiO_3$ thin film (referred to as BST thin film, hereafter). The MOCVD apparatus 30 includes three raw material containers 32, in which molten raw material liquids are filled. Into these raw material containers 32, an Ar gas as a carrier gas is introduced via mass flow controllers 34. The evaporated molten raw material liquids are transported by the carrier gas to a mixer 36 to be mixed. The raw materials thus mixed are sent to a deposition chamber 38. At that time, $O_2$ gas is also sent to the chamber 38 via a mass flow controller 40. The interior of the deposition chamber 38 is kept at a low pressure state with a booster pump 42 and a rotary pump 44. A BST thin film is formed on a substrate 50 by bombarding the substrate 50 with the gas mixture under that condition. It is noted that the area enclosed by the dotted lines from the raw material containers 32 up to the deposition chamber 38 is kept at a high temperature so that the raw materials are conveyed to the deposition chamber 38 while kept in a gas state.

Figure 3:
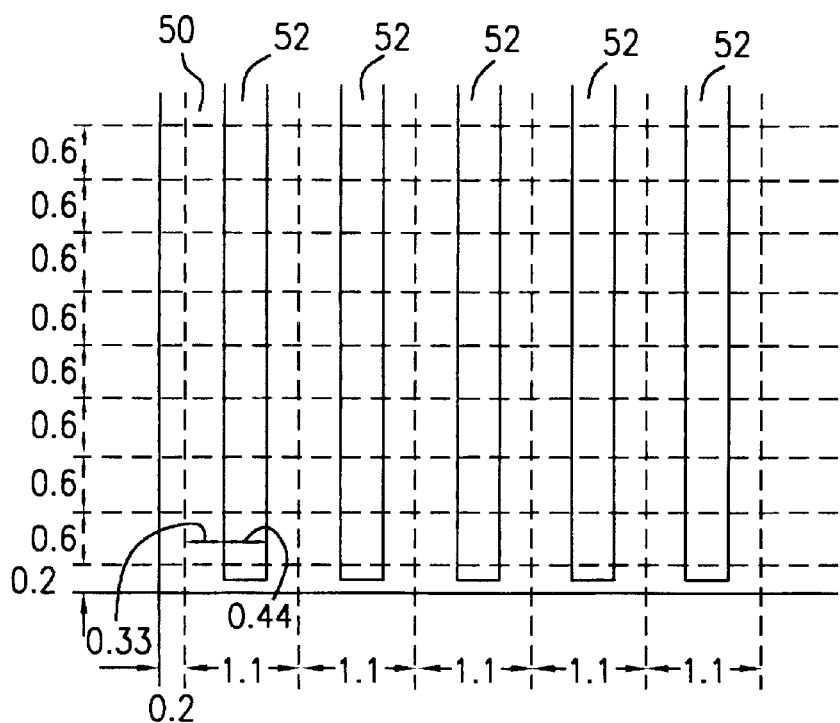
FIG. 3 is a view showing BST thin film patterns fabricated in the Example.
Figure 7:
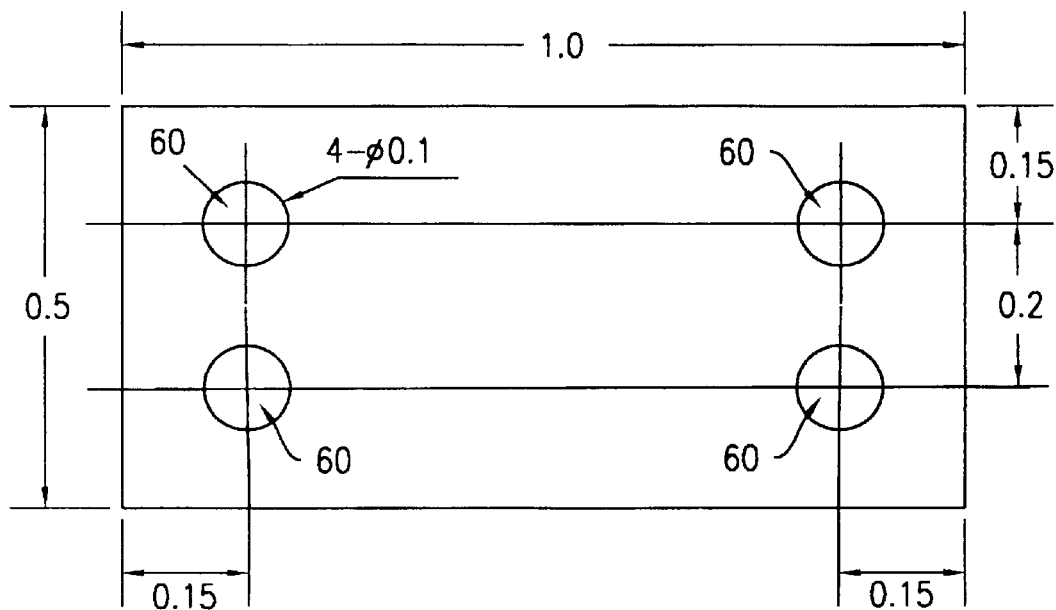
FIG. 7 is a view showing a deposition pattern of the protective film fabricated in the Example.

An R-plane sapphire ($Al_2O_3$) substrate which is 0.1 mm in thickness and 2 inches by 2 inches in size was prepared for forming a BST thin film using this MOCVD apparatus 30. BST thin films 52 having a pattern as shown in FIG. 3 were formed using a metal mask and under the conditions described in Table 1. The deposition time was 75 minutes and the film thickness was 120 nm. It is noted that the dotted lines in FIG. 3 indicate the sections to be cut, and the trimming allowance was 0.1 mm. It is also noted that the dimensions as shown in FIG. 3 through to FIG. 7 are in mm units.

TABLE 1

| | |
|---|---|
| Ba raw material | $Ba(DPM)_2(tetraene)_2$ |
| Temperature of the Ba evaporator | 120° C. |
| Amount of the Ba evaporator carrier gas (Ar) flow | 100 ml/min |
| Sr raw material | $Sr(DPM)_2(triene)_2$ |
| Temperature of the Sr evaporator | 110° C. |
| Amount of the Sr evaporator carrier gas (Ar) flow | 50 ml/min |
| Ti raw material | $Ti(O-i-C_3H_7)_4$ |
| Temperature of the Ti evaporator | 40° C. |
| Amount of the Ti evaporator carrier gas (Ar) flow | 25 ml/min |
| Amount of the $O_2$ gas flow | 700 ml/min |
| Temperature of the evaporator | 150° C. |
| Deposition temperature | 650° C. |
| Pressure in the deposition chamber | 1.3 kPa |
| Deposition time | 75 min |

Figure 4:
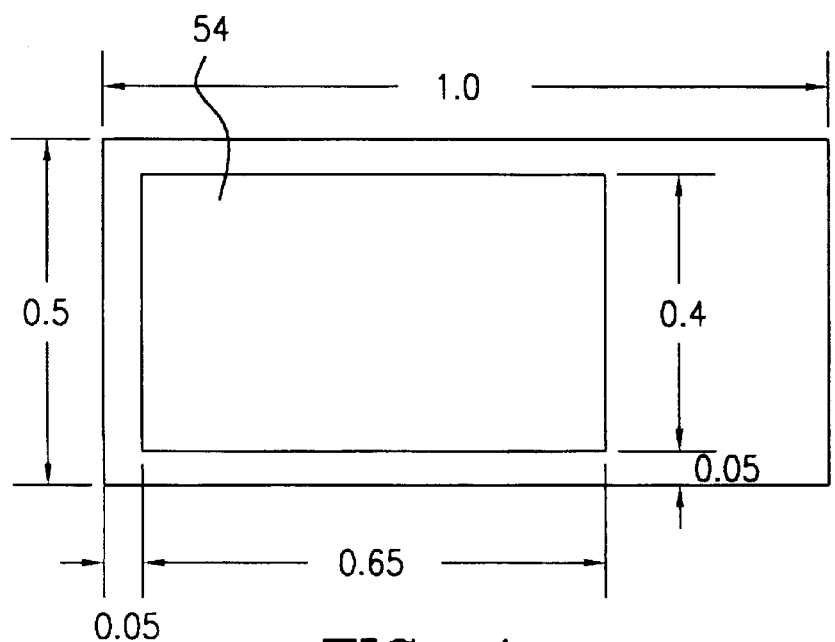
FIG. 4 is a view showing a Pt film pattern fabricated in the Example.

To be noted is that a Pt film 54 was formed by a sputtering method with a pattern as shown in FIG. 4, before performing deposition of the BST thin film 52. The dimensions indicated in FIG. 4 through to FIG. 7 conform to those obtained after performing the cutting along the sections to be cut as shown by the dotted lines in FIG. 3. An RF sputtering device was used for the Pt film deposition. The deposition time was 100 seconds and the film thickness was about 150 nm.

TABLE 2

| | |
|---|---|
| Pressure before deposition | $6.7 \times 10^{-4}$ Pa |
| Pressure at deposition | 0.67 Pa |
| Ar flow amount | 10 ml/min |
| RF power | 250 W |
| Deposition temperature | 70° C. |

Figure 5:
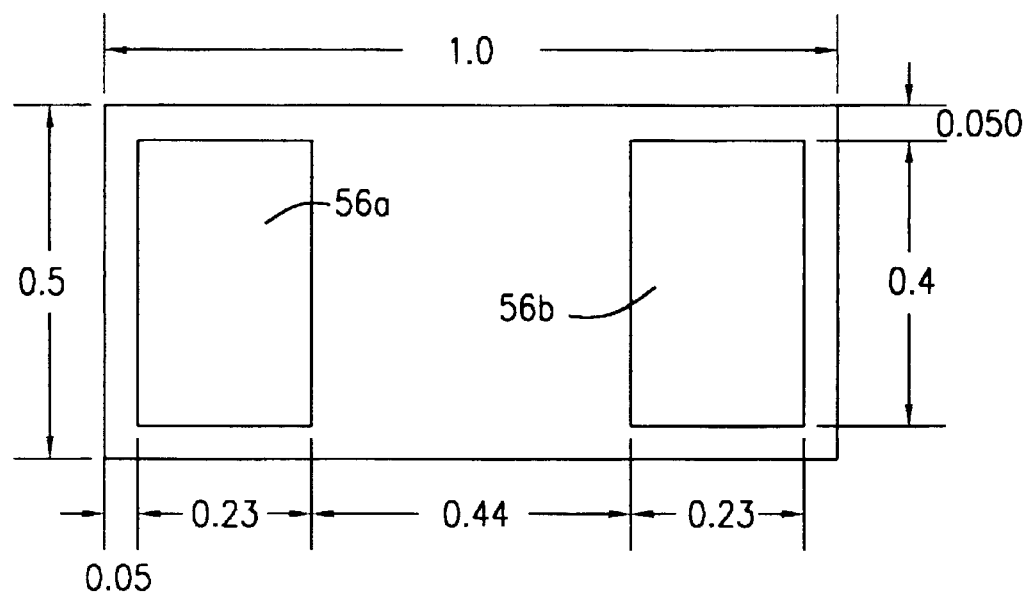
FIG. 5 is a view showing another Pt film pattern fabricated in the Example.

By forming a Pt film 54 with a pattern as shown in FIG. 4 on a substrate 50, and forming a BST thin film 52 with a pattern as shown in FIG. 3 thereover, a state is realized in which the Pt film 54 is exposed from the BST thin film 52 only at one side in the lengthwise direction of the substrate 50 after cutting. In this state, Pt films 56a and 56b were formed with a pattern as shown in FIG. 5 and under the conditions described in Table 2. The deposition time was 80 seconds. The film thickness was adjusted to be 120 nm, similar to that of the BST thin film 52. Therefore, the Pt films 54 and 56a were connected electrically with each other at one end side in the lengthwise direction of the substrate 50.

Figure 6:
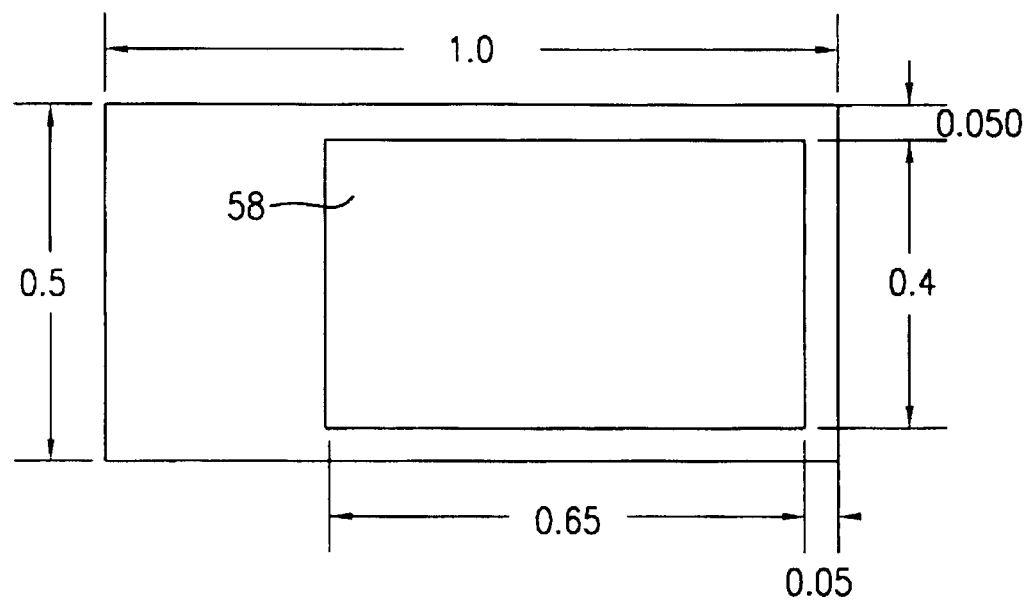
FIG. 6 is a view showing still another Pt film pattern fabricated in the Example.

Next, a Pt film 58 with a pattern as shown in FIG. 6 was formed under the conditions described in Table 2. The deposition time was 90 seconds. Therefore, the Pt films 56b and 58 were connected electrically with each other at the other side in the lengthwise direction of the substrate 50 after cutting. Then, a BST thin film 52 was formed over it to have a pattern as shown in FIG. 3. Therefore, a state was realized in which the Pt film 56a was exposed from the BST thin film 52 at one side in the lengthwise direction of the substrate 50, and the Pt film 58 was exposed from the BST thin film 52 at the other side. Furthermore, a BST thin film 52 on a lower layer was connected to a BST thin film 52 on its upper layer at the end portion of the Pt film 58 which is at one side in the lengthwise direction of the substrate 50.

As described above, over the substrate 50, a Pt film 54, a BST thin film 52, Pt films 56a and 56b, a Pt film 58, a BST thin film 52 . . . , a BST thin film 52, Pt films 56a and 56b, are sequentially formed, and a Pt film 54 or a Pt film 58 was formed at the end. A thin film laminated body having 15 layers of BST thin films 52 was thus fabricated. The thin film laminated body thus obtained was treated at 650° C. in an oxygen atmosphere for three hours. Next, a silicon oxide film was deposited as a protective film, using a plasma CVD method and under the conditions described in Table 3, in order to cover the whole surfaces of the dielectric layers and the electrode layers.

TABLE 3

| Si raw material | TEOS(Si(OC$_2$H$_5$)$_4$) |
| --- | --- |
| TEOS flow amount | 100 ml/min |
| O$_2$ gas flow amount | 5,000 ml/min |
| Substrate temperature | 350° C. |
| Chamber pressure | 667 Pa |
| Film thickness | 200 nm |

Furthermore, a resist having four openings 60 was formed as shown in FIG. 7, the silicon oxide film at the openings was removed by ion trimming, and cutting was performed along the dotted lines as shown in FIG. 3. After that, solder was placed on the parts where the silicon oxide film was removed to form solder bumps. As a result, 3,735 pieces of thin film multilayer capacitors having a structure as shown in FIG. 1 could be fabricated.

Figure 8:
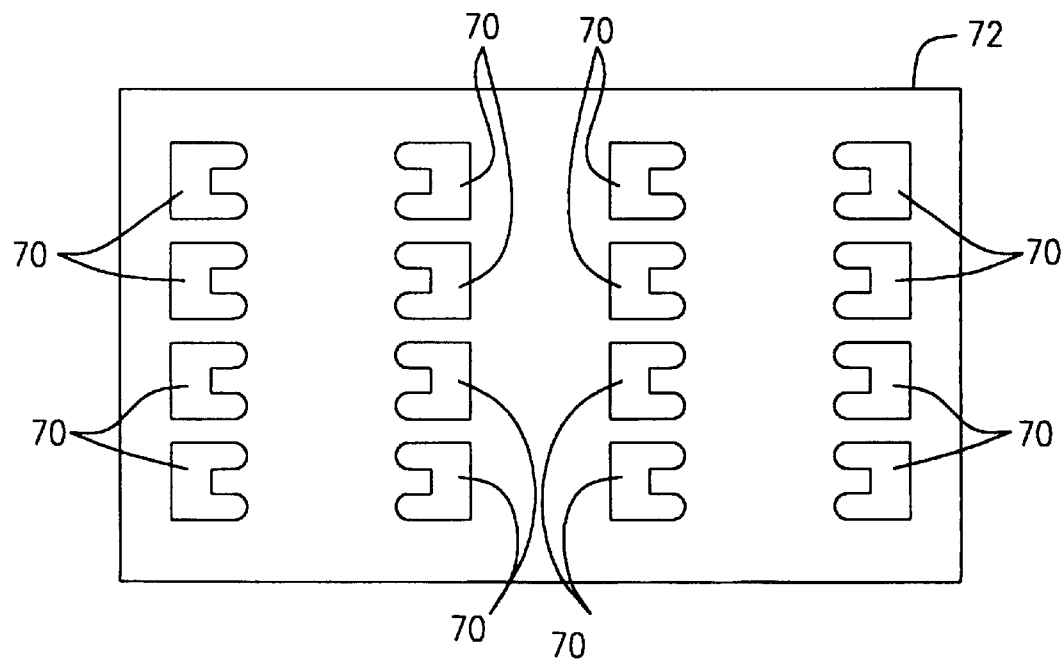
FIG. 8 is a plan view showing a wiring layer pattern on a wiring substrate on which the thin film multilayer capacitor fabricated in the Example is to be mounted.
Figure 9:
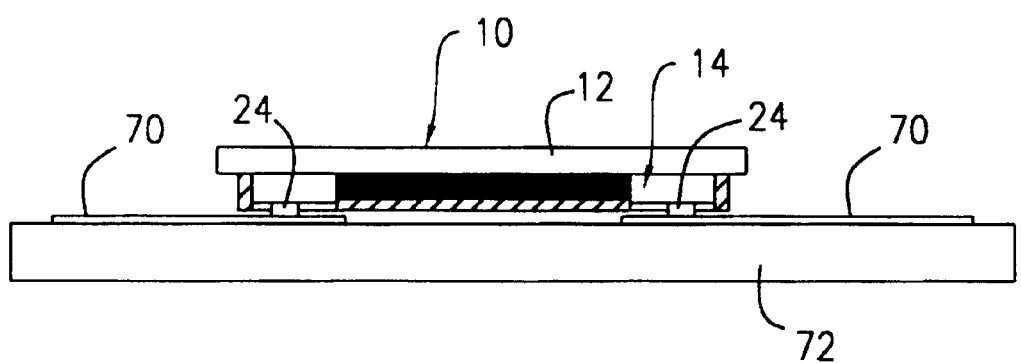
FIG. 9 is a front illustrative view showing the wiring substrate on which the thin film multilayer capacitor as shown in FIG. 8 is mounted.

Next, a wiring substrate 72 having wiring layer pieces 70 metallized thereon as shown in FIG. 8 was prepared. On this wiring substrate 72, the wiring layer pieces 70 were formed at a distance from each other so that they correspond to the locations of the solder bumps of the thin film multilayer capacitor. Accordingly, the thin film multilayer capacitor was connected to the wiring layer pieces 70 by solder reflowing as shown in FIG. 9. In this way, 100 pieces of thin film multilayer capacitors were connected to the wiring substrate 72, and were subjected to measurement of capacitance and tan δ at 1 kHz. The results are shown in Table 4.

TABLE 4

| Capacitance | Average value | 0.11 μF |
| --- | --- | --- |
| | CV value | 2.5% |
| tan δ | Average value | 1.5% |
| | CV value | 2.2% |
| Short circuit rate | | 3% |

As is understood from Table 4, a capacitance of 0.1 μF or more was obtained with the thin film multilayer capacitor having 15 layers of BST thin film. Furthermore, the relative dielectric constant of the BST thin films calculated from this characteristic value is 600 or more, indicating that BST thin films having a high dielectric constant were obtained with a good reproducibility.

Furthermore, the height of this thin film multilayer capacitor connected to the wiring substrate is about 0.12 mm, providing a capacitor which is very low in height. If one layer of this BST thin film is added to the thin film multilayer capacitor, it results in an increase of only 270 nm in thickness. Therefore, a thin film multilayer capacitor having a larger capacitance can be obtained by increasing the number of the laminated layers.

According to the present invention, it is possible to obtain a thin film multilayer capacitor which is small, thin, and of a large capacitance. Furthermore, when this thin film multilayer capacitor is mounted on a wiring substrate, it is possible to move the capacitor over to the wiring substrate while holding it by the substrate side so that damage on the thin film multilayer capacitor is prevented at the time of movement. Furthermore, it is possible to mount the thin film multilayer capacitor without contacting the wiring substrate and keeping it in a configuration parallel with the wiring substrate, so that damages on the thin film multilayer capacitor by an external stress can be prevented.

What is claimed is:

1. A thin film multilayer capacitor comprising:
   a substrate and a laminated body comprising a plurality of dielectric layers and electrode layers on said substrate; the laminated body having a substrate side and a surface side opposite the substrate side; wherein there are at least three solder bumps adapted for external connection on the surface side of said laminated body; wherein said electrode layers comprise a plurality of first electrode layers and a plurality of second electrode layers which are electrically isolated by said dielectric layers, a first electrode layer being laminated with a second electrode layer in an alternate manner with a dielectric layer lying therebetween and partially covering said first and second electrode layers so that said plurality of first electrode layers are electrically connected with each other at portions where said dielectric layers are not present, and said plurality of second electrode layers are electrically connected with each other at the other portions where said dielectric layers are not present;
   further comprising a protective film which has openings on the surface side of said laminated body, and wherein each of said solder bumps electrically connect to an electrode layer at said openings.

2. A thin film multilayer capacitor according to claim 1, wherein said dielectric layers comprise a MOCVD oxide thin film comprising at least one of Ba and Sr.

3. A thin film multilayer capacitor according to claim 2, wherein said MOCVD oxide thin film is made from a dipivaloylmethanate complex adduct with a triethylenetetramine or tetraethylenepentamine raw material.

4. A thin film multilayer capacitor mounting comprising a thin film multilayer capacitor according to claim 3 and a wiring substrate having wirings, wherein said solder bumps are electrically connected to wirings on said wiring substrate.

5. A thin film multilayer capacitor mounting comprising a thin film multilayer capacitor according to claim 2 and a wiring substrate having wirings, wherein said solder bumps are electrically connected to wirings on said wiring substrate.

6. A thin film multilayer capacitor mounting comprising a thin film multilayer capacitor according to claim 1 and a wiring substrate having wirings, wherein said solder bumps are electrically connected to wirings on said wiring substrate.

7. A method of making a thin film multilayer capacitor mounting comprising providing a thin film multilayer capacitor according to claim 1 and a wiring substrate having wirings, positioning said solder bumps so that they can be electrically connected to wirings on said wiring substrate, and electrically connecting said solder bumps to said wirings.

8. A thin film multilayer capacitor comprising:
   a substrate and a laminated body comprising a plurality of dielectric layers and electrode layers on said substrate; the laminated body having a substrate side and a surface side opposite the substrate side; wherein there are at least three solder bumps adapted for external connection on the surface side of said laminated body; further comprising a protective film which has openings on the surface side of said laminated body, and wherein each of said solder bumps electrically connect to an electrode layer at said openings.

9. A thin film multilayer capacitor according to claim 8, wherein said electrode layers comprise a plurality of first electrode layers and a plurality of second electrode layers which are electrically isolated by said dielectric layers, a first electrode layer being laminated with a second electrode layer in an alternate manner with a dielectric layer lying therebetween and partially covering said first and second electrode layers so that said plurality of first electrode layers are electrically connected with each other at portions where said dielectric layers are not present, and said plurality of second electrode layers are electrically connected with each other at the other portions where said dielectric layers are not present.

10. A thin film multilayer capacitor according to claim 8, wherein said dielectric layers comprise a MOCVD oxide thin film comprising at least one of Ba and Sr.

11. A thin film multilayer capacitor according to claim 10, wherein said MOCVD oxide thin film is made from a dipivaloylmethanate complex adduct with a triethylenetetramine or tetraethylenepentamine raw material.

12. A thin film multilayer capacitor mounting comprising a thin film multilayer capacitor according to claim 11 and a wiring substrate having wirings, wherein said solder bumps are electrically connected to wirings on said wiring substrate.

13. A thin film multilayer capacitor mounting comprising a thin film multilayer capacitor according to claim 10 and a wiring substrate having wirings, wherein said solder bumps are electrically connected to wirings on said wiring substrate.

14. A thin film multilayer capacitor mounting comprising a thin film multilayer capacitor according to claim 8 and a wiring substrate having wirings, wherein said solder bumps are electrically connected to wirings on said wiring substrate.

15. A thin film multilayer capacitor mounting comprising a thin film multilayer capacitor according to claim 9 and a wiring substrate having wirings, wherein said solder bumps are electrically connected to wirings on said wiring substrate.

16. A thin film multilayer capacitor mounting comprising a thin film multilayer capacitor according to claim 8 and a wiring substrate having wirings, wherein said solder bumps are electrically connected to wirings on said wiring substrate.

17. A method of making a thin film multilayer capacitor mounting comprising providing a thin film multilayer capacitor according to claim 8 and a wiring substrate having wirings, positioning said solder bumps so that they can be electrically connected to wirings on said wiring substrate, and electrically connecting said solder bumps to said wirings.

18. A method of making a thin film multilayer capacitor mounting comprising providing a thin film multilayer capacitor according to claim 9 and a wiring substrate having wirings, positioning said solder bumps so that they can be electrically connected to wirings on said wiring substrate, and electrically connecting said solder bumps to said wirings.

19. A method of making a thin film multilayer capacitor mounting comprising providing a thin film multilayer capacitor according to claim 8 and a wiring substrate having wirings, positioning said solder bumps so that they can be electrically connected to wirings on said wiring substrate, and electrically connecting said solder bumps to said wirings.

* * * * *